US007013916B1

(12) United States Patent
Pearlstein et al.

(10) Patent No.: US 7,013,916 B1
(45) Date of Patent: Mar. 21, 2006

(54) SUB-ATMOSPHERIC GAS DELIVERY METHOD AND APPARATUS

(75) Inventors: Ronald Martin Pearlstein, Macungie, PA (US); John Giles Langan, Pleasanton, CA (US); Dao-Hong Zheng, Shanghai (CN); John Irven, High Wycombe (GB); Benjamin Lee Hertzler, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 744 days.

(21) Appl. No.: 09/641,933

(22) Filed: Aug. 18, 2000

Related U.S. Application Data

(63) Continuation-in-part of application No. 09/189,562, filed on Nov. 11, 1998, now Pat. No. 6,314,986.

(30) Foreign Application Priority Data

Nov. 14, 1997 (GB) .................................... 9724168

(51) Int. Cl.
*F16K 11/20* (2006.01)
*F16K 31/12* (2006.01)
*G05D 7/00* (2006.01)

(52) U.S. Cl. .......................... 137/613; 137/12; 137/14; 137/238; 137/312; 137/383; 137/505.11; 137/505.13; 137/565.23

(58) Field of Classification Search ................ 137/240, 137/597, 2, 12, 14, 238, 312, 494, 497, 501, 137/505, 505.11, 505.13, 510, 565.23, 383, 137/385, 613

See application file for complete search history.

(56) References Cited

U.S. PATENT DOCUMENTS 255,338 A 3/1882 Salomon (Continued)

FOREIGN PATENT DOCUMENTS

CZ 250347 9/1986

(Continued)

OTHER PUBLICATIONS

"*A New Era In Gas Handling Safety: Sub-Atmospheric . . .* " McManus, JV, et al, Semiconductor Fabtech.

(Continued)

*Primary Examiner*—George L. Walton
(74) *Attorney, Agent, or Firm*—McAndrews, Held & Malloy, Ltd.

(57) ABSTRACT

An apparatus for containing and delivering hazardous gases at sub-atmospheric pressure from a pressurized container is provided which includes a valve body in sealed communication with an outlet orifice of the pressurized container. The outlet orifice of the pressurized container is open to an interior chamber of the pressurized container. A fluid discharge path is located in the valve body, between the outlet orifice of the pressurized container and an outlet orifice of the valve body. A pressure regulator having a pressure sensing means capable of responding to sub-atomospheric pressure, is integral to the valve body, in-line in the fluid discharge path with the pressure regulator pre-set to a pressure below atmospheric pressure to allow the gas to be delivered through the regulator from the interior chamber only when the pressure regulator senses a downstream pressure at or below the pre-set pressure. Finally, a high pressure shut-off valve integral to the valve body and in-line in the fluid discharge path and upstream from the pressure regulator is included. The gas flows through from the interior chamber of the pressurized container through the fluid discharge path, through the outlet orifice of the pressurized container, and through the outlet orifice of the valve body only when the outlet orifice is connected to a vacuum system. A method of containing and delivering hazardous gases at sub-atmospheric pressure is also provided.

39 Claims, 5 Drawing Sheets

U.S. PATENT DOCUMENTS

| | | | | | |
|---|---|---|---|---|---|
| 788,352 | A | | 4/1905 | Crawford | |
| 1,042,745 | A | | 10/1912 | Zahm | |
| 1,731,519 | A | | 10/1929 | Bastian | |
| 1,837,233 | A | | 12/1931 | Rumpff | |
| 1,916,635 | A | | 7/1933 | Pepper | |
| 2,057,150 | A | | 10/1936 | Kehl et al. | 50/23 |
| 2,091,051 | A | | 8/1937 | Mesinger | 50/23 |
| 2,105,864 | A | | 1/1938 | Saunders | 251/31 |
| 2,237,052 | A | | 4/1941 | Gill | 62/1 |
| 2,322,468 | A | | 6/1943 | Redrup | 50/35 |
| 2,357,777 | A | | 9/1944 | White | 62/1 |
| 2,499,527 | A | | 3/1950 | Raymond | 137/53 |
| 2,502,588 | A | | 4/1950 | Preston et al. | 62/1 |
| 2,509,078 | A | | 5/1950 | Stover | 73/205 |
| 2,517,534 | A | | 8/1950 | Courtot | 50/23 |
| 2,608,971 | A | | 9/1952 | Holmes | 128/142 |
| 2,623,331 | A | | 12/1952 | Greening | 50/14 |
| 2,645,884 | A | | 7/1953 | Kellie | 50/10 |
| 2,654,976 | A | | 10/1953 | Jörgensen | 50/21 |
| 2,666,297 | A | | 1/1954 | Skousgaard | 251/123 |
| 2,675,793 | A | | 4/1954 | Ziege | 123/121 |
| 2,693,823 | A | | 11/1954 | Sogge | 137/614.21 |
| 2,750,071 | A | | 6/1956 | Ritchie | 222/3 |
| 2,765,983 | A | | 10/1956 | Mayo | 236/34 |
| 2,854,991 | A | | 10/1958 | Webster | 137/322 |
| 2,861,587 | A | | 11/1958 | Hursen | 137/494 |
| 2,918,930 | A | | 12/1959 | Jansen | 137/81 |
| 2,925,987 | A | | 2/1960 | Priesmeyer | 251/61 |
| 3,083,721 | A | | 4/1963 | Matthews et al. | 137/63 |
| 3,095,890 | A | | 7/1963 | Cousteau et al. | 137/63 |
| 3,137,308 | A | | 6/1964 | Machlanski et al. | 137/63 |
| 3,212,525 | A | | 10/1965 | Henderson | 137/625.4 |
| 3,214,134 | A | | 10/1965 | Noakes | 251/282 |
| 3,245,583 | A | | 4/1966 | Miller et al. | 222/52 |
| 3,276,470 | A | | 10/1966 | Griffing | 137/505.15 |
| 3,319,649 | A | | 5/1967 | Cummins | 137/505.18 |
| 3,561,477 | A | * | 2/1971 | Pinto | 137/613 |
| 3,566,913 | A | | 3/1971 | Parthe, Jr. | 137/493 |
| 3,604,445 | A | * | 9/1971 | Jordan et al. | 137/613 |
| 3,650,290 | A | | 3/1972 | Moen et al. | 137/339 |
| 3,709,242 | A | | 1/1973 | Chase | 137/81 |
| 3,720,222 | A | | 3/1973 | Andrews et al. | 137/154 |
| 3,746,036 | A | | 7/1973 | Du Bois et al. | 137/496 |
| 3,756,271 | A | | 9/1973 | Grogono et al. | 137/494 |
| 3,766,933 | A | | 10/1973 | Nicholson, Jr. | 137/116.3 |
| 3,776,267 | A | | 12/1973 | Alley | 137/494 |
| 3,787,023 | A | | 1/1974 | Shufflebarger et al. | 251/335 B |
| 3,795,258 | A | * | 3/1974 | Iung | 137/613 |
| 3,797,803 | A | | 3/1974 | Goto et al. | 251/61.5 |
| 3,811,467 | A | | 5/1974 | Jones | 137/494 |
| 3,827,246 | A | | 8/1974 | Moen et al. | 62/50 |
| 3,845,876 | A | | 11/1974 | Needham et al. | 220/203 |
| 3,885,589 | A | * | 5/1975 | Iung | 137/613 |
| 3,939,872 | A | | 2/1976 | Wentworth, Jr. | 138/31 |
| 3,955,794 | A | | 5/1976 | Hankosky | 251/123 |
| 3,982,559 | A | | 9/1976 | Ochs | 137/455 |
| 4,004,608 | A | | 1/1977 | Kish | 137/510 |
| 4,040,445 | A | | 8/1977 | McCormick | 137/596.18 |
| 4,044,737 | A | | 8/1977 | Nishimura | 123/119 |
| 4,044,739 | A | | 8/1977 | Miura et al. | 123/119 A |
| 4,061,483 | A | | 12/1977 | Burg | 62/268 |
| 4,070,001 | A | | 1/1978 | Musgrove | 251/46 |
| 4,108,197 | A | | 8/1978 | Brakebill | 137/81 |
| 4,120,480 | A | | 10/1978 | Ando et al. | 251/61.5 |
| 4,128,391 | A | | 12/1978 | Braunstein | 431/354 |
| 4,166,607 | A | | 9/1979 | Webb | 251/335 B |
| 4,167,198 | A | | 9/1979 | Kotyza et al. | 137/528 |
| 4,169,486 | A | | 10/1979 | Otteman et al. | |
| 4,198,854 | A | | 4/1980 | Washington et al. | 73/38 |
| 4,201,366 | A | | 5/1980 | Danko et al. | 251/335 B |
| 4,211,387 | A | | 7/1980 | Getchell et al. | 251/335 B |
| 4,228,777 | A | | 10/1980 | Haase | 123/454 |
| 4,232,695 | A | | 11/1980 | Roberge | 137/1 |
| 4,237,920 | A | | 12/1980 | Norman | 137/243.3 |
| 4,287,909 | A | | 9/1981 | Tompson et al. | 137/312 |
| 4,335,742 | A | | 6/1982 | Jacyno | 137/494 |
| 4,348,005 | A | | 9/1982 | Eaton et al. | 251/268 |
| 4,349,136 | A | | 9/1982 | Fallon et al. | 222/396 |
| 4,376,376 | A | | 3/1983 | Gregory | 62/51 |
| 4,383,547 | A | | 5/1983 | Lorenz et al. | |
| 4,431,117 | A | | 2/1984 | Genbauffe et al. | 222/3 |
| 4,434,778 | A | | 3/1984 | Morita et al. | 123/587 |
| 4,484,695 | A | | 11/1984 | Fallon et al. | 222/23 |
| 4,487,334 | A | | 12/1984 | Werding | 222/55 |
| 4,497,339 | A | | 2/1985 | Gruner et al. | 137/495 |
| 4,508,132 | A | | 4/1985 | Mayfield, Jr. et al. | 137/62 |
| 4,520,838 | A | | 6/1985 | Fisher et al. | 137/69 |
| 4,526,341 | A | | 7/1985 | Thomas | 251/63.5 |
| 4,537,385 | A | | 8/1985 | Bragg et al. | 251/214 |
| 4,554,942 | A | | 11/1985 | Williams et al. | |
| 4,556,193 | A | | 12/1985 | Yoshiga | 251/129.11 |
| 4,583,372 | A | | 4/1986 | Egan et al. | 62/53 |
| 4,606,195 | A | | 8/1986 | Winkler | 62/45 |
| 4,634,099 | A | | 1/1987 | Danko et al. | 251/335.3 |
| 4,640,221 | A | | 2/1987 | Barbee et al. | 118/689 |
| 4,659,061 | A | | 4/1987 | Scheffel | 251/332 |
| 4,687,017 | A | | 8/1987 | Danko et al. | 137/315 |
| 4,706,929 | A | | 11/1987 | Kalaskie et al. | 251/14 |
| 4,709,575 | A | | 12/1987 | Myers | 73/23 |
| 4,723,967 | A | | 2/1988 | Tom | 55/36 |
| 4,738,693 | A | | 4/1988 | Tom | 55/36 |
| 4,744,221 | A | | 5/1988 | Knollmueller | 62/48 |
| 4,754,897 | A | | 7/1988 | Brace | 222/402 |
| 4,756,310 | A | | 7/1988 | Bitterly | 128/400 |
| 4,763,690 | A | | 8/1988 | Martin | 137/613 |
| 4,815,699 | A | | 3/1989 | Mueller | 251/129.11 |
| 4,821,907 | A | | 4/1989 | Castles et al. | 220/5 |
| 4,828,219 | A | | 5/1989 | Ohmi et al. | 251/118 |
| 4,844,111 | A | | 7/1989 | Pritchard et al. | 137/71 |
| 4,846,440 | A | | 7/1989 | Carlson et al. | 251/129.17 |
| 4,869,301 | A | * | 9/1989 | Ohmi et al. | 141/85 |
| 4,905,723 | A | | 3/1990 | Pritchard et al. | 137/71 |
| 4,909,269 | A | | 3/1990 | Pritchard et al. | 137/71 |
| 4,917,136 | A | | 4/1990 | Ohmi et al. | 137/15 |
| 5,033,499 | A | | 7/1991 | Patel et al. | |
| 5,056,759 | A | | 10/1991 | Schlesch | 251/330 |
| 5,071,453 | A | | 12/1991 | Hradek et al. | 55/21 |
| 5,086,801 | A | | 2/1992 | Peacock et al. | 137/12 |
| 5,086,807 | A | | 2/1992 | Lasnier et al. | |
| 5,117,797 | A | | 6/1992 | Telep et al. | 123/520 |
| 5,127,436 | A | | 7/1992 | Campion et al. | |
| 5,131,627 | A | | 7/1992 | Kolenc | 251/331 |
| 5,137,047 | A | | 8/1992 | George | |
| 5,156,827 | A | | 10/1992 | Tom et al. | 423/299 |
| 5,163,475 | A | | 11/1992 | Gregoire | |
| 5,165,655 | A | | 11/1992 | Drexel et al. | 251/129.02 |
| 5,209,253 | A | | 5/1993 | Taylor | 137/67 |
| 5,217,043 | A | | 6/1993 | Novakovi | 137/460 |
| 5,238,016 | A | | 8/1993 | Eidsmore | 137/1 |
| 5,238,024 | A | | 8/1993 | Taylor | 137/613 |
| 5,241,987 | A | * | 9/1993 | Ohmi et al. | 137/597 |
| 5,255,525 | A | | 10/1993 | Wieland et al. | 62/46.1 |
| 5,263,477 | A | | 11/1993 | Crome | 128/205.24 |
| 5,271,232 | A | | 12/1993 | Ogawa et al. | 62/50.1 |
| 5,297,578 | A | | 3/1994 | Scott et al. | 13/510 |
| 5,305,791 | A | | 4/1994 | Kowalchuk | 137/613 |
| 5,329,966 | A | | 7/1994 | Fenimore et al. | 137/613 |
| 5,337,790 | A | | 8/1994 | Heritier-Best et al. | 251/129.21 |
| 5,341,968 | A | | 8/1994 | Vandoninck | 222/396 |
| 5,357,758 | A | | 10/1994 | Andonian | 62/45.1 |
| 5,368,062 | A | * | 11/1994 | Okumura et al. | 137/597 |
| 5,390,697 | A | | 2/1995 | Muschelknautz | 137/494 |
| 5,392,815 | A | | 2/1995 | Stuart | 138/37 |
| 5,398,725 | A | | 3/1995 | Nakazawa et al. | 137/636.1 |

| | | | | | |
|---|---|---|---|---|---|
| 5,409,526 | A | | 4/1995 | Zheng et al. | 96/132 |
| 5,421,366 | A | | 6/1995 | Naffziger et al. | 137/614.2 |
| 5,438,837 | A | | 8/1995 | Caldwell et al. | 62/50.1 |
| 5,440,477 | A | | 8/1995 | Rohrberg et al. | |
| 5,442,927 | A | | 8/1995 | Germain | 62/50.2 |
| 5,443,090 | A | | 8/1995 | Ligh | 137/489 |
| 5,452,738 | A | | 9/1995 | Borland et al. | 137/265 |
| 5,456,281 | A | | 10/1995 | Teay | 137/505.12 |
| 5,518,528 | A | | 5/1996 | Tom et al. | 95/103 |
| 5,544,785 | A | | 8/1996 | Frigiere | 222/3 |
| 5,553,635 | A | | 9/1996 | Gregoire | 137/1 |
| 5,566,713 | A | | 10/1996 | Lhomer et al. | |
| 5,597,009 | A | | 1/1997 | Scherrer et al. | 137/375 |
| 5,601,107 | A | | 2/1997 | Moore et al. | 137/15 |
| 5,605,179 | A | | 2/1997 | Strong, Jr. et al. | |
| 5,634,627 | A | | 6/1997 | Daido et al. | 251/335.3 |
| 5,651,528 | A | | 7/1997 | Frei et al. | 251/54 |
| 5,657,786 | A | * | 8/1997 | DuRoss et al. | 137/240 |
| 5,673,897 | A | | 10/1997 | Crochet et al. | 251/63.6 |
| 5,678,602 | A | * | 10/1997 | Cannet et al. | 137/613 |
| 5,678,803 | A | | 10/1997 | Shinohara et al. | 251/368 |
| 5,704,965 | A | | 1/1998 | Tom et al. | 95/95 |
| 5,704,967 | A | | 1/1998 | Tom et al. | 96/143 |
| 5,707,424 | A | | 1/1998 | Tom et al. | 95/95 |
| 5,727,589 | A | | 3/1998 | Yokogi | |
| 5,740,833 | A | | 4/1998 | Olds et al. | 137/505.12 |
| 5,749,227 | A | | 5/1998 | Smith et al. | 60/657 |
| 5,749,389 | A | | 5/1998 | Ritrosi et al. | |
| 5,755,254 | A | | 5/1998 | Carter et al. | 137/340 |
| 5,755,255 | A | | 5/1998 | Iwabuchi | 137/341 |
| 5,755,364 | A | | 5/1998 | LeCoffre et al. | 222/564 |
| 5,761,910 | A | | 6/1998 | Tom | 62/46.1 |
| 5,819,782 | A | | 10/1998 | Itafuji | 137/240 |
| 5,820,102 | A | | 10/1998 | Borland | 251/144 |
| 5,836,351 | A | | 11/1998 | Underwood, III | 137/587 |
| 5,845,675 | A | | 12/1998 | Ligh | 137/489 |
| 5,890,876 | A | | 4/1999 | Suito et al. | 417/213 |
| 5,895,376 | A | | 4/1999 | Schwartz et al. | 604/256 |
| 5,909,747 | A | | 6/1999 | Schieber | 137/492 |
| 5,913,505 | A | | 6/1999 | Ouvrard et al. | 251/303 |
| 5,915,410 | A | | 6/1999 | Zajac | 137/234.1 |
| 5,916,245 | A | | 6/1999 | Tom | 62/46.1 |
| 5,935,305 | A | | 8/1999 | Tom et al. | 96/143 |
| 5,937,895 | A | | 8/1999 | Le Febre et al. | 137/494 |
| 5,941,506 | A | | 8/1999 | Smith et al. | 251/335.3 |
| 5,964,446 | A | | 10/1999 | Walton et al. | 251/127 |
| 5,996,617 | A | | 12/1999 | Olds et al. | 137/505.46 |
| 6,000,419 | A | | 12/1999 | Bernhard | 137/15 |
| 6,003,535 | A | | 12/1999 | Ollivier | 137/15 |
| 6,007,609 | A | | 12/1999 | Semerdjian et al. | 96/108 |
| 6,012,478 | A | | 1/2000 | Park | |
| 6,027,547 | A | | 2/2000 | Tom et al. | 95/96 |
| 6,045,115 | A | | 4/2000 | Martin, Jr. et al. | 251/118 |
| 6,089,027 | A | | 7/2000 | Wang et al. | 62/46.1 |
| 6,101,816 | A | | 8/2000 | Wang et al. | 62/48.1 |
| 6,105,598 | A | * | 8/2000 | Cabrera et al. | 137/113 |
| 6,186,177 | B1 | | 2/2001 | Maher | 137/884 |
| 6,210,482 | B1 | | 4/2001 | Kitayama et al. | 118/715 |
| 6,216,739 | B1 | | 4/2001 | Fukushima et al. | 137/884 |

FOREIGN PATENT DOCUMENTS

| | | |
|---|---|---|
| EP | 0 275 242 | 7/1988 |
| EP | 0 308 875 | 3/1989 |
| EP | 0459 966 | 12/1991 |
| EP | 0 512 553 | 11/1992 |
| EP | 0 588 531 | 3/1994 |
| EP | 0 470 009 | 2/1995 |
| EP | 0 688 983 | 12/1995 |
| EP | 0 747 796 | 12/1996 |
| EP | 0916891 | 5/1999 |
| EP | 0916891 | 8/1999 |
| GB | 403 238 | 12/1933 |
| GB | 743011 | 1/1956 |
| GB | 1215303 | 12/1970 |
| GB | 1430213 | 3/1976 |
| GB | 2 045 414 | 10/1980 |
| JP | 57-207913 | 12/1982 |
| JP | 61-266884 | 11/1986 |
| JP | 91-219172 | 9/1991 |
| JP | 93-039898 | 2/1993 |
| JP | 93-215299 | 8/1993 |
| WO | WO 94/17334 | 8/1994 |
| WO | WO 96/07843 | 3/1996 |
| WO | WO 96/29529 | 9/1996 |
| WO | 9909137 | 2/1999 |
| WO | WO 00/79159 | 6/2000 |
| WO | WO 00/67089 | 11/2000 |

OTHER PUBLICATIONS

"*Sub-Atmospheric Pressure Gas Delivery System For Chemical.*" Donatucci, et al, IBM Microelectronics Div.

"*Reducing the HPM Risk: Pressure-actuated Gas Delivery*", Olander, et al, Semiconductor Fabtech.

George et al., "Minimising System contamination potential from gas handling", *Semiconductor International*, pp. 98-104, Jul., 1993.

Fine et al., "Design and Operation of UHP Low Vapor Pressure and Reactive Gas Delivery Systems", *Semiconductor International*, pp. 138-143, Oct., 1995.

Pierce et al., "Safe Usage of C1F3: Supply, vacuum service, and exhaust gas management", *Solid State Technology*, vol. 40, Issue 9, Sep., 1997.

First UK Patent Search Report for GB 9724168.1, UK Patent Office, Jun. 23, 1998.

Second UK Patent Search Report for GB 9724168.1, UK Patent Office, Oct. 14, 1998.

Third UK Patent Search Report for GB 9724168.1, UK Patent Office, Oct. 14, 1998.

Fourth UK Patent Search Report for GB 9724168.1, UK Patent Office, Oct. 14, 1998.

"A Revolutionary Actuator for Microstructures," Sensors, Helmers Microsystems, Inc., Feb. 1993.

"Benefits of a Minimalist Gas System Design," *Solid State Technology*, pp. 151, 155, Philips et al., Oct. 1996.

"The Next Step in Process Gas Delivery: A Fully Integrated System," *Semiconductor International,* pp. 79, 85, Cestari et al., Jan. 1997.

* cited by examiner

SUB-ATMOSPHERIC GAS DELIVERY METHOD AND APPARATUS

CROSS-REFERENCE TO RELATED APPLICATIONS

This application is a continuation-in-part of and claims the benefit of U.S. patent application Ser. No. 09/189,562 filed on Nov. 11, 1998, now U.S. Pat. No. 6,314,986 B1, issued on Nov. 13, 2001, which claims priority to GB 9724168, filed on Nov. 14, 1997.

STATEMENT REGARDING FEDERALLY SPONSORED RESEARCH OR DEVELOPMENT

Not applicable.

BACKGROUND OF THE INVENTION

The present invention is directed to an integral delivery valve/regulator for pressurized gas storage containers. In particular, the present invention is directed to an integral delivery valve/regulator for pressurized gas storage containers that requires sub-atmospheric pressure to enable the withdrawal of the gas from the container.

Toxic and other hazardous specialty gases are used in a number of industrial applications, including semiconductor device fabrication. Many users of these hazardous specialty gases are concerned about the possibility of an unintentional release. By virtue of having a positive gauge pressure, pressurized gases in cylinders will be released immediately once a shut-off valve attached to the pressurized cylinder is opened. Even with a gas-tight outlet cap in place (as required for most hazardous gases), unintentional opening of the valve can lead to serious consequences when the cap is removed. Although always undesirable, a hazardous gas release may be particularly undesirable in semiconductor processing applications. Such a release would necessitate a partial or complete evacuation of the semiconductor processing factory, leading to substantial losses in scrap product and unscheduled downtime. Also, the sensitive and expensive equipment used in semiconductor processing factories may be damaged by exposure to even traces of the hazardous gas.

Many hazardous gas containers are outfitted with restrictive flow orifices in the valve outlet to limit the rate of release of the gas in the event of an accidental release. Although a restrictive flow orifice may significantly reduce the hazardous gas release rate, any release can still cause a considerable disruption to operations, and the hazard risk to personnel will not be totally eliminated. Furthermore, flow restriction may be unacceptable due to impracticably limiting the flow of the gas while the cylinder is in service. Excess flow sensors coupled to automatic shut-off valves can shut off flow in the event of a leak in a delivery system, but will only be effective when the release is substantially larger than the delivery flow-rate and if it occurs downstream of the automatic shutoff valve. It may also be possible to trigger a shut-off valve based on a hazardous gas monitor near the possible leakage points. All such systems, however, are complex and costly, and are only effective for gas containers that are already properly installed in a gas delivery system. Many semiconductor manufacturing processes, such as ion-implantation, chemical vapor deposition, reactive ion etching, high-density plasma etching, and the like, use hazardous gases at sub-atmospheric pressure (i.e. below ambient pressure). As a result, the gas cylinder need not provide the gas with a positive gauge pressure in all cases.

For the purposes of the present invention, the term gas, as indicated herein, encompasses both a permanent gas and a vapor of a liquified gas. Permanent gases are gases which, practically, cannot be liquified by pressure alone. Vapors of liquified gases are present above the liquid in a compressed gas cylinder. Gases which liquify under pressure as they are compressed for filling into a cylinder are not permanent gases and are more accurately described as liquified gases under pressure or as vapors of liquified gases.

One approach to providing sub-atmospheric gas delivery is a method described by Knollmueller in U.S. Pat. No. 4,744,221 and by Tom, et al. in U.S. Pat. Nos. 5,518,528, 5,704,965 and 5,704,967 wherein a hazardous gas is physically or chemically adsorbed on the surface of a sorbent within a container to lower the equilibrium pressure of the desired species in the container. While this method has been employed for the storage and delivery of certain gases (see, e.g., McManus, J. V. et al., *Semiconductor Fabtech*, Volume 7, 1998), the method has significant limitations. First, the amount of gas stored in a given volume of the adsorbent used is relatively small compared to a liquefied compressed gas (e.g. phosphine) thereby requiring a relatively large vessel which utilizes valuable footprint space, which is important, for example, when these gases are used in a semiconductor fabrication cleanroom. Also, heat transfer limitations in the solid sorbent will limit the rate at which gas can be desorbed compared to that from a compressed gas (e.g. silicon tetrafluoride).

Knollmueller (U.S. Pat. No. 4,744,221) describes a process of adsorbing a gas onto a solid sorbent so that the equilibrium pressure of the gas is reduced inside of a vessel. By heating the vessel, the equilibrium pressure in the vessel could be increased and permit the delivery of the gas at above-atmospheric pressure. However, heating of specialty gases is undesirable because it may be slow, hard to control and cause decomposition of the gas. Also, when heated so that the delivery pressure is increased, there is decreased protection against accidental release of the gas.

Tom, et al. (U.S. Pat. No. 5,518,528 and subsequently U.S. Pat. Nos. 5,704,965 and 5,704,967) improved on this concept by using a sorbent where the gas could be released without substantial decomposition by reducing the downstream pressure. These sorbents still have a disadvantage of needing to be optimized for each sorbate (hazardous gas). Further, the equilibrium pressure in the vessel in this system is constantly being decreased as product is withdrawn. This phenomenon makes gas flow control more difficult and limits the fraction of the gas charged into the vessel that may be withdrawn by the user. Also, in the event that the ambient temperature increases, the pressure inside the vessel could potentially increase above atmospheric pressure, decreasing the protection against accidental release. Conversely, at cooler temperatures, there may not be sufficient pressure to deliver the gas.

An additional concern when storing hazardous gases under sub-ambient pressures is the likelihood of inboard contamination of the vessel in the event of a leak due to the vacuum. Not only will this atmospheric contamination adversely affect the purity the gas, but, with respect to the above method, it could also conceivably react with the adsorbed gas stored under sub-ambient pressure and generate heat, pressure or corrosive by-products. An additional problem with this method is that the pressure of the gas being delivered is a function of both the quantity of adsorbed gas remaining and the temperature of the adsorbent. Hence, the pressure in the vessel containing the adsorbed gas could easily exceed atmospheric pressure if the contents are heated. Also, the delivery pressure undesirably decreases as the contents of the vessel are depleted. Eventually, the delivery pressure diminishes to a point where sufficient flow can no longer be sustained. At this point, the source must be replaced, even though there may be substantial inventory of gas remaining in the adsorbed phase relative to the initial charge.

Another approach to providing sub-atmospheric gas delivery is a device described by Le Febre et al. in U.S. Pat. No. 5,937,895. Here, the device provides a regulator that uses a valve element that is responsive, in one embodiment, to a vacuum condition downstream of the regulator. The valve only allows flow when this vacuum condition occurs downstream of the valve such that the possibility of accidental spillage or release of toxic liquid or gases is reduced. Note that no sorbents are used as described in the Knollmueller and Tom patents. This patent also teaches use of its sub-atmospheric gas delivery device with an internal flow restriction within the storage container as disclosed in U.S. Pat. No. 6,045,115. This flow restrictor provides a capillary size opening that limits the discharge of gas phase fluid from the pressurized container. As indicated in the '115 patent, liquid discharge from the container may be particularly hazardous since the mass rate of discharge of liquid will greatly exceed the mass rate of discharge of the corresponding gas through a particular opening. The '115 patent locates the entry point of the capillary flow restrictor at approximately the midpoint of the length of the cylinder. This therefore prevents discharge of a liquid in the cylinder whether the cylinder is upside down or right side up. However, a negative aspect of this design is that the capillary system may be prone to clogging. Once plugged, the cylinder would be difficult or impossible to empty of the hazardous gas.

To accomplish the same result of preventing discharge of a liquid, PCT Patent Application No. PCT/US99/09137, teaches use of a pressurized container which uses a phase separation device, which is a porous membrane that is permeable to vapor or gas deriving from liquid in the container, but is not permeable to the liquid. Here, the phase separator is disposed upstream of the pressure regulator so that fluid is prevented from entering and interfering with the function of the regulator and preventing egress of liquid from the vessel. The regulator is a flow device which can be set at a predetermined level to dispense gas or vapor from the container at a vessel pressure level which may be superatmospheric, sub-atmospheric, or atmospheric pressure, depending on dispensing conditions.

The present invention overcomes the limitations of the prior art by reducing the pressure to sub-atmospheric mechanically, rather than by sorption and by use of a high pressure valve upstream of the regulator. While negative pressure regulators (also known as absolute pressure regulators or vacuum regulators) are well-known, by placing this functionality integral to a gas storage and delivery package, use of one provides the unique benefits not afforded by a stand-alone regulator. This integral valve/regulator, which may be pre-set and locked to provide only sub-ambient pressures, beneficially reduces the risk of accidental release of gases.

European Patent Application EP 0 916 891 A2 discloses a modular gas control valve having a high pressure shut off valve upstream of a regulator. Here, the purpose of the shut-off valve is for dispensing control. The system taught here is for a standard compressed gas system, not for a system that only provides the gas when the pressure downstream of the regulator is sub-atmospheric. The use in preventing liquid interfering with the regulator is not taught.

None of the prior art teaches an apparatus for containing and delivering hazardous gases at sub-atmospheric pressure from a pressurized container which includes a sub-atmospheric pressure regulator to allow the gas in the container to be delivered only when the pressure sensing means senses a downstream pressure at or below a pre-set pressure, and which includes a high pressure shut-off valve upstream of the pressure regulator. The gas may flow only when said outlet orifice of the apparatus is connected to a vacuum system. The high pressure valve upstream of the regulator in the integral valve/regulator provides numerous advantages as will be discussed in detail below.

It is principally desired to provide an apparatus for containing and delivering hazardous gases from a pressurized container.

It is further desired to provide an apparatus for containing and delivering hazardous gases at sub-atmospheric pressure from a pressurized container.

It is still further desired to provide an apparatus for containing and delivering hazardous gases that reduces the possibility of accidental spills or release of the hazardous gas.

It is also further desired to provide an apparatus for containing and delivering hazardous gases without the need for sorbents to control the handling, storage, and delivery of toxic fluids.

It is further desired to provide an apparatus for containing and delivering hazardous gases that may only discharge its contents when placed in service with a vacuum system.

It is still further desired to provide an apparatus for containing and delivering hazardous gases that can only dispense a hazardous gas when conditions downstream of the apparatus are at a desired pressure less than atmospheric pressure.

It is also further desired to provide an apparatus for containing and delivering hazardous gases that does not require use of a restrictive flow orifice.

It is further desired to provide an apparatus for containing and delivering hazardous gases that does not require use of excess flow sensors coupled to automatic shut-off valves to shut off unintentional flow of the hazardous gas.

It is still further desired to provide an apparatus for containing and delivering hazardous gases without the need for a shut-off valve coupled to a hazardous gas monitor near possible leakage points.

It is also further desired to provide an apparatus for containing and delivering hazardous gases at sub-atmospheric pressure where the likelihood of inboard contamination of the vessel in the event of a leak due to the vacuum is minimized.

Finally, it is desired to provide an apparatus for containing and delivering hazardous gases which requires a relatively small amount of space.

BRIEF SUMMARY OF THE INVENTION

The present invention provides a delivery valve/regulator apparatus for pressurized gas storage containers that requires sub-atmospheric pressure downstream of the valve to enable the withdrawal of the gas from the container. Included in the delivery valve/regulator apparatus is a high pressure shut-off valve upstream of a pressure reducing device or regulator. This high pressure shut-off valve acts to prevent liquid from getting into the regulator which would cause an unacceptably high discharge rate. Since a primary objective of the present invention is to provide fail-safe delivery, this high pressure shut-off valve serves as a back-up to the pressure reducing device in preventing unintentional gas release during transportation, connection and disconnection from the users' apparatus. Optionally, the high-pressure shut-off valve is pneumatically or otherwise mechanically actuated and is biased to be normally closed when not pneumatically or otherwise energized.

An apparatus for containing and delivering hazardous gases at sub-atmospheric pressure from a pressurized container is provided which includes a valve body in sealed communication with an outlet orifice of the pressurized container. The outlet orifice of the pressurized container is open to an interior chamber of the pressurized container. A fluid discharge path is located in the valve body, between the outlet orifice of the pressurized container and an outlet orifice of the valve body. A pressure regulator having a pressure sensing means capable of responding to sub-atmospheric pressure, integral to the valve body, in-line in the fluid discharge path with the pressure regulator pre-set to a pressure below atmospheric pressure to allow the gas to be delivered through the regulator from the interior chamber only when the pressure regulator senses a downstream pressure at or below the pre-set pressure. Finally, a high pressure shut-off valve integral to the valve body and in-line in the fluid discharge path and upstream from the pressure regulator is included. The gas flows through from the interior chamber of the pressurized container through the fluid discharge path, through the outlet orifice of the pressurized container, and through the outlet orifice of the valve body only when the outlet orifice is connected to a vacuum system.

Optionally, the pressure regulator is preset and locked at the pressure below atmospheric. Also, optionally included is a low pressure shut-off valve in-line in the fluid discharge path, downstream of the pressure regulator, to control flow of gas from the gas cylinder and to protect the regulator from ingress of ambient air during storage and transit when the low pressure shut-off valve is in a closed position. The high pressure shut-off valve may be biased to be normally closed when no energized vacuum system is connected to the outlet orifice of the valve body. A filling path in the valve body between the outlet orifice of the pressurized container and a filling port orifice of the valve body may be included. Optionally, a residual pressure valve, in-line in the fluid discharge path, upstream of the high-pressure shut-off valve and downstream of the outlet orifice of the container, to prevent back flow of air or foreign gases may be included. The pressure regulator may be fixed at a pre-set pressure or may be variable. A valve protection cap removably disposed on the pressurized container may serve as a secondary containment means for vapors leaking from the container and the apparatus. The valve protection cap may have a port to attach to a leak detection device. Finally, the vacuum system may include a compressor that withdraws gas from the vessel at sub-atmospheric pressure and then compresses the gas to deliver the gas at a higher pressure.

DETAILED DESCRIPTION OF THE INVENTION

Figure 3:
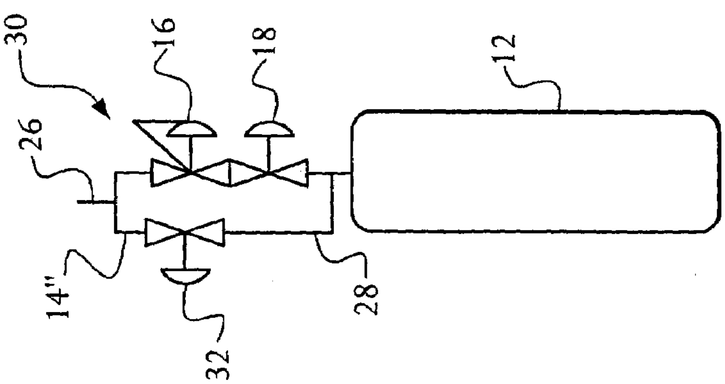
FIG. 3 is a simplified front view of a second alternate configuration of a sub-atmospheric gas delivery apparatus in accordance with one preferred embodiment of the present invention.

The present invention provides a delivery valve/regulator apparatus for pressurized gas storage containers that requires sub-atmospheric pressure downstream of the valve to enable the withdrawal of gas from the container. Included in the delivery valve/regulator apparatus is a high pressure shut-off valve upstream of a pressure reducing device or regulator. This high pressure shut-off valve acts to prevent liquid from getting into the regulator from the container which would cause an unacceptably high discharge rate. Since a primary objective of the present invention is to provide fail-safe delivery, this high pressure shut-off valve serves as a back-up to the pressure reducing device in preventing unintentional gas release during transportation, connection and disconnection from the users' apparatus. Optionally, the high-pressure shut-off valve is pneumatically or otherwise mechanically actuated and is biased to be normally closed when not pneumatically or otherwise energized.

Further, when delivering a highly hazardous gas in a sub-ambient condition, it may be particularly advantageous to evacuate the upstream side of the pressure regulator to remove potential impurities before using the gas. Again, it is advantageous to again evacuate the system after using the gas container to evacuate the space just upstream of the regulator of toxic gases. These evacuations are only possible when there is a positive shut-off valve upstream of the regulator.

As indicated above, a safe means of delivering hazardous gases would be afforded by using an absolute pressure regulator, i.e. a regulator which has its pressure sensing means capable of responding to sub-atmospheric pressure instead of atmospheric pressure, that is integral to the gas cylinder package. Such a regulator could be pre-set and locked at a convenient pressure below 0 psig (e.g., about −5 psig) which would ensure that no gas would be delivered if the containers outlet valve or other delivery system components were inadvertently opened to the atmosphere. The gas would flow, however, only when the system is properly connected to a vacuum system. An added benefit of this design is that the regulator also acts help to prevent backflow into the cylinder, even when the pressure in the container were below atmospheric. The delivery pressure would be chosen to provide sufficient driving force for flow so that the molar flow rate of the gas could be accurately controlled.

The delivery pressure setting of the regulator may be adjusted by use of a fixed spring, or could use an adjustable spring requiring a special key to adjust or could use a partially evacuated or pressurized dome load. Alternatively, the pressure regulating device could consist of a microelectromechanical system (MEMS) comprised of a pressure sensor and a micromachined control valve both etched, for example, in a single silicon wafer that is part of the gas flow path. In any embodiment of this invention, however, a critical feature of the delivery system is that the maximum delivery pressure is always below that of normal atmospheric pressure under any conditions that the container may reasonably be expected to be exposed.

When the contents of the cylinder are depleted so that the weight or internal pressure of the cylinder falls below an acceptable level, the cylinder may be changed in the usual manner, replacing it with a full container. The spent container could be refilled by a gas supplier by using a separate channel built into the container, having a specially keyed valve and a gas-tight outlet cap, one or both of which may only be open by the gas supplier by using specially keyed tools.

Figure 2:
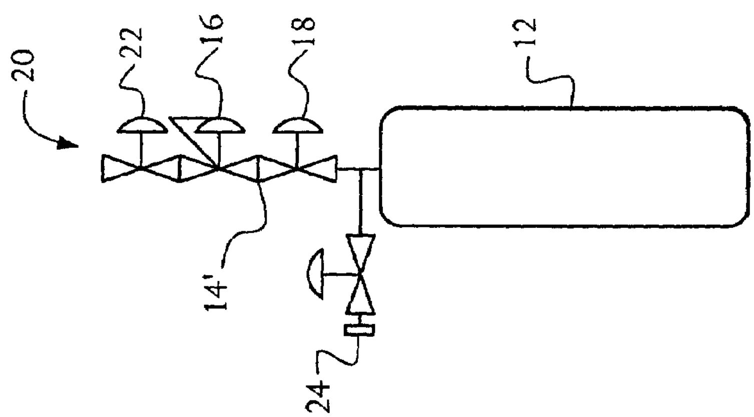
FIG. 2 is a simplified front view of a first alternate configuration of a sub-atmospheric gas delivery apparatus in accordance with one preferred embodiment of the present invention.
Figure 1:
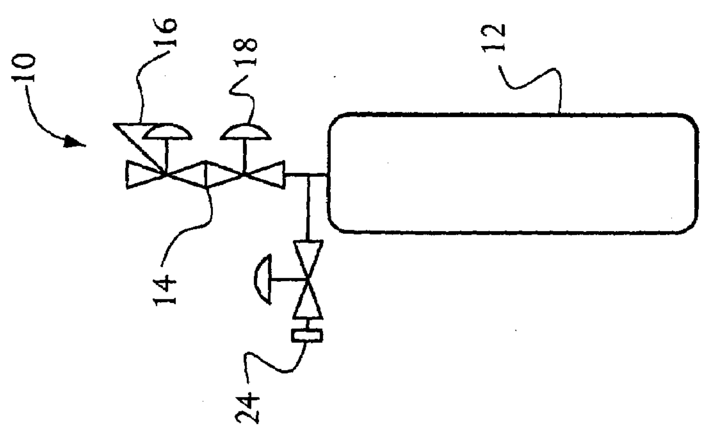
FIG. 1 is a simplified front view of sub-atmospheric gas delivery apparatus in accordance with one preferred embodiment of the present invention.

Referring now to the drawings, wherein like reference numbers refer to like elements throughout the several views, there is shown in FIGS. 1–7 several configurations of an apparatus for containing and delivering hazardous gases at sub-atmospheric pressure from a pressurized container. FIG. 1 depicts an apparatus for containing and delivering hazardous gases 10 in the form of a gas cylinder 12 having an integral valve/regulator assembly 14 attached thereto. Preferably, a standard compressed gas cylinder 12 is used which is closed with the valve/regulator assembly 14 into which is built an absolute pressure regulator 16 and a high pressure shut-off valve 18 on the high pressure, i.e. upstream, side of the regulator 16. Similarly, FIG. 2 depicts an apparatus for containing and delivering hazardous gases 20 where a high pressure shut off valve 18 is located on the high pressure side of the regulator 16 and a low pressure shut off valve 22 is located on the low pressure side of the regulator 16 in the valve/regulator assembly 14'. Note that in the interest of brevity, the common details of the apparatus 10 and 20 will be given the same reference numbers and their construction and operation will not be reiterated. Only the different features will be described in detail. Here, a function of gas delivery control may be provided by the optional low-pressure valve 22. The purpose of this low-pressure valve 22 is to control the flow of the gas being withdrawn from the cylinder, and more importantly to protect the regulator 16 from ingress of ambient air during storage and transit. This feature is particularly important when delivering corrosive or reactive gases such as HCl, HBr, $SiH_4$, $BCl_3$, etc., where air contamination can lead to corrosion or solids formation or both. Once the gas user has completed using the gas, the high pressure valve 18 is closed and the residual gas is evacuated from the valve/regulator assembly 14'. Before the valve/regulator assembly 14' of the present embodiment is disconnected from the components downstream, the low-pressure valve 22 downstream of the regulator 16 is closed to prevent air from being sucked into the evacuated space when the system is disconnected.

When discussed herein, note that reference to the high pressure valve 18 and the low pressure valve 22 refer to the location of the valve in the flowpath, not necessarily, the physical characteristics of the valves. That is, the high pressure valve 18 is closest to the pressurized gas cylinder 12 and is upstream of the regulator 16, and the low pressure valve 22 is downstream of the high pressure valve 18 and the regulator 16.

In one mode of operation, an inert gas (e.g. dry $N_2$, Ar, etc.) may be introduced into the valve/regulator assembly 14' before closing the low-pressure valve 22 to further reduce the risk of air ingress into the regulator 16 during transit. Thus, an additional role of the high-pressure shut-off valve 18 is to positively separate and thereby prevent the contamination or dilution of the hazardous process gas with the inert purge gas used to blanket the regulator in transit. Optionally, the high pressure shut-off valve 18 may be biased to be normally closed when no energized vacuum system is connected to the outlet orifice of the valve body, by means known in the art.

A refill port 24 may be separate, as shown in the embodiments of FIGS. 1 and 2, or combined with the withdrawal port 26 by using a bypass line 28 and valve 32 as indicated on the apparatus for containing and delivering hazardous gases at sub-atmospheric pressure 30 in FIG. 3. Note again that in the interest of brevity, the common details of the apparatus 10, 20, and 30 will be given the same reference numbers and their construction and operation will not be reiterated. Only the different features will be described in detail.

Figure 4:
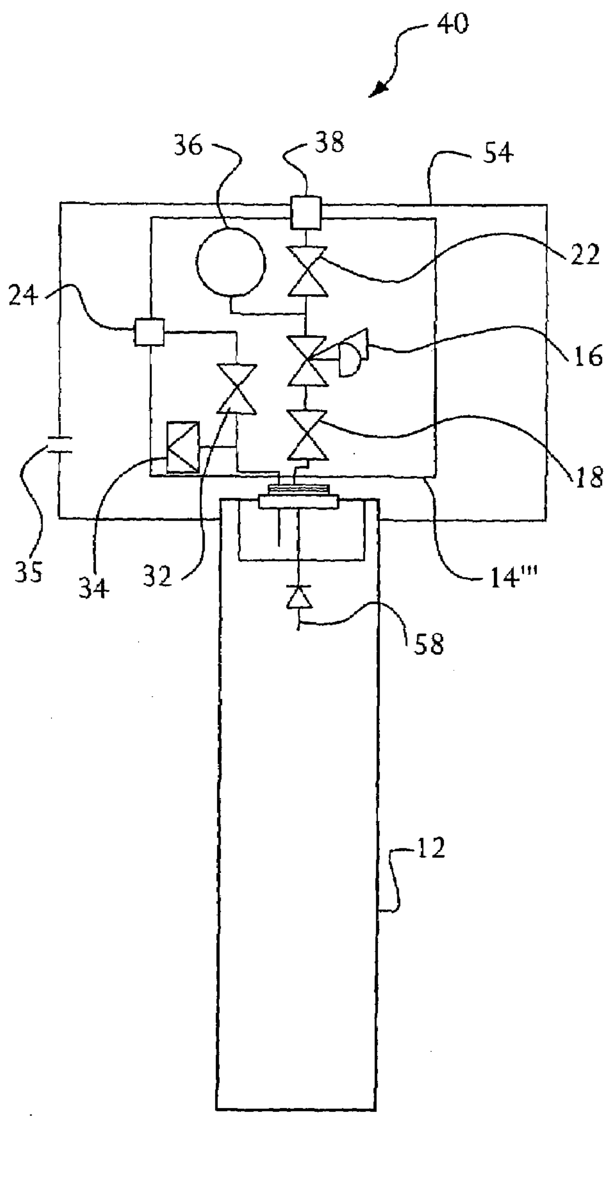
FIG. 4 is a simplified front view of a third alternate configuration of a sub-atmospheric gas delivery apparatus in accordance with one preferred embodiment of the present invention.
Figure 5:
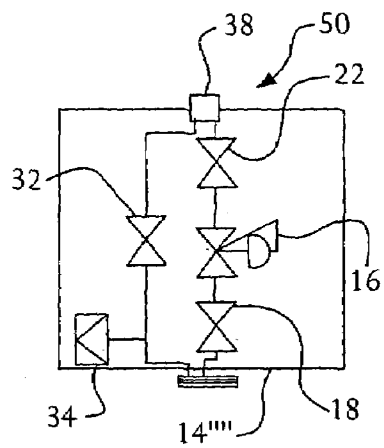
FIG. 5 is a partial, simplified front view of a fourth alternate configuration of a sub-atmospheric gas delivery apparatus in accordance with one preferred embodiment of the present invention.

A specific embodiment of an apparatus for containing and delivering hazardous gases (for this example $C_4F_6$) at sub-ambient pressure 40 is shown in FIG. 4, and with significantly more detail in FIGS. 8–12, which has a valve/regulator apparatus 14''' with a two port configuration similar to FIG. 2. A single port valve/regulator assembly 14'''' embodiment 50 is shown in FIG. 5 which is similar to FIG. 3. Again, in the interest of brevity, the common details of the apparatus 10, 20, 30, 40 and 50 will be given the same reference numbers and their construction and operation will not be reiterated. Only the different features will be described in detail.

If required by transport authorities, an optional pressure relief device 34 may be included as shown in FIGS. 4 and 5. Also, a pressure gauge 36 that is calibrated for sub-ambient pressures may be included to monitor the delivery pressure. See FIGS. 4 and 8.

Additionally, a pressure gauge, upstream of the regulator, can be included for on-liquified compressed gases to indicate content of gas in container.

In this example, the gas user connects to outlet port 38 (see FIGS. 8 and 10) which may be, for example, specified in accordance with the Diameter Index Safety System of the Compressed Gas Association, and then to his or her process equipment by using the appropriate connection adapter, commonly called a pigtail adapter. After optionally purging contaminants from the spaces exposed to air, the pressure downstream of the valve/regulator assembly 14 is reduced below atmospheric pressure. The high pressure valve 18 and the low pressure valve 22 may then be opened allowing the gas flow to commence.

Figure 6:
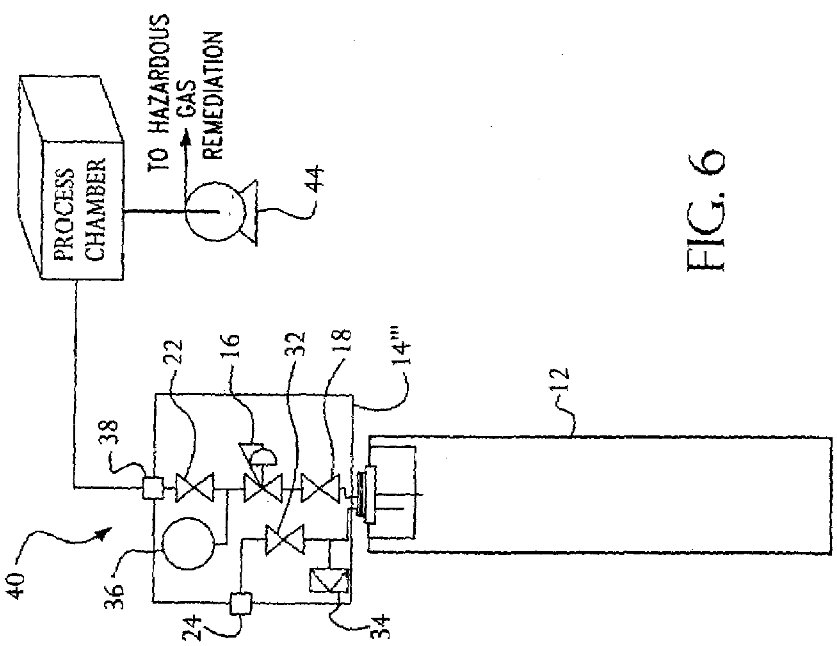
FIG. 6 is a simplified front view of the configuration of FIG. 4, with the flow directed through a processing chamber.
Figure 9:
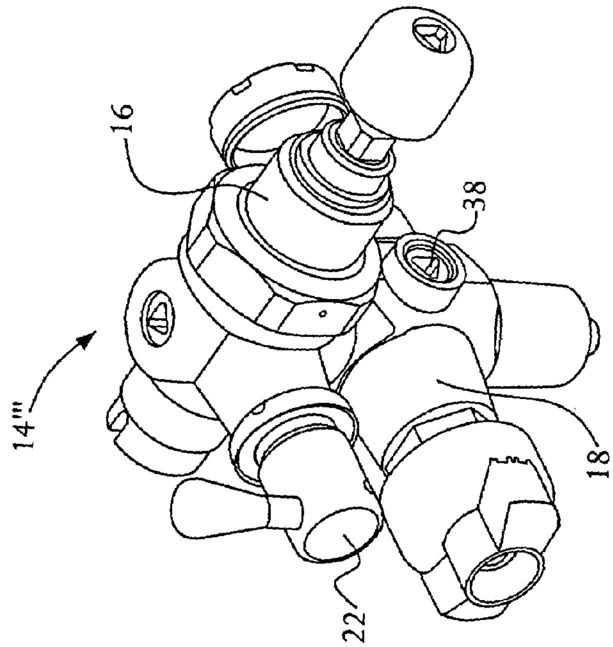
FIG. 9 is a rear isometric view of the configuration of FIG. 4.
Figure 8:
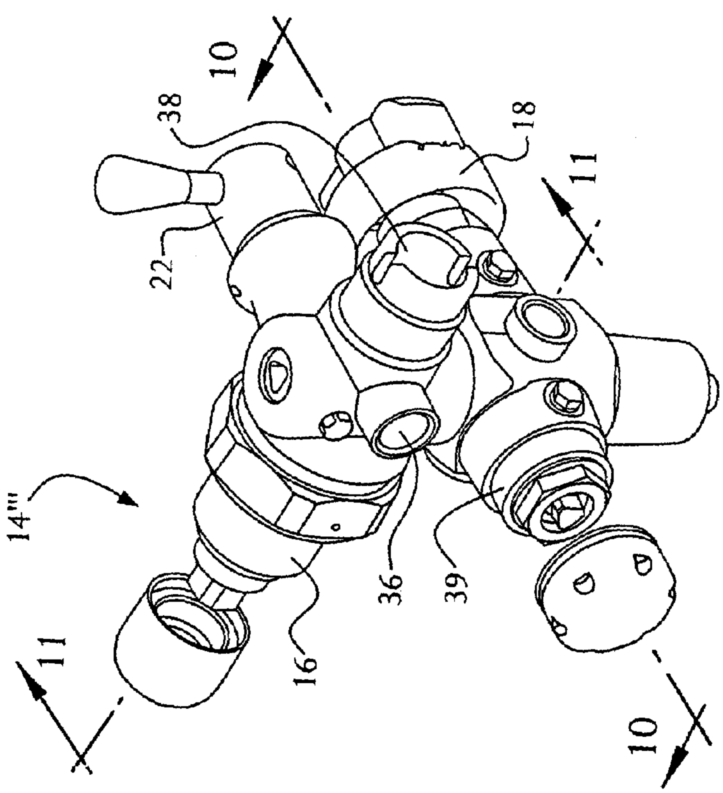
FIG. 8 is a front isometric view of the configuration of FIG. 4.
Figure 11:
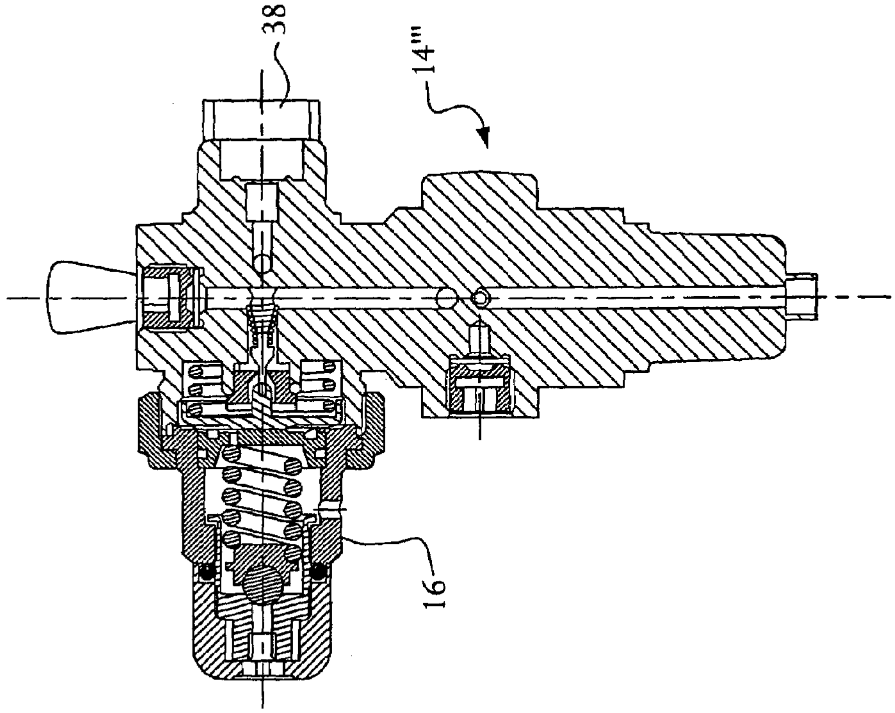
FIG. 11 is a cross sectional view of the configuration of FIG. 4, taken substantially along line 11B11 of FIG. 8.
Figure 10:
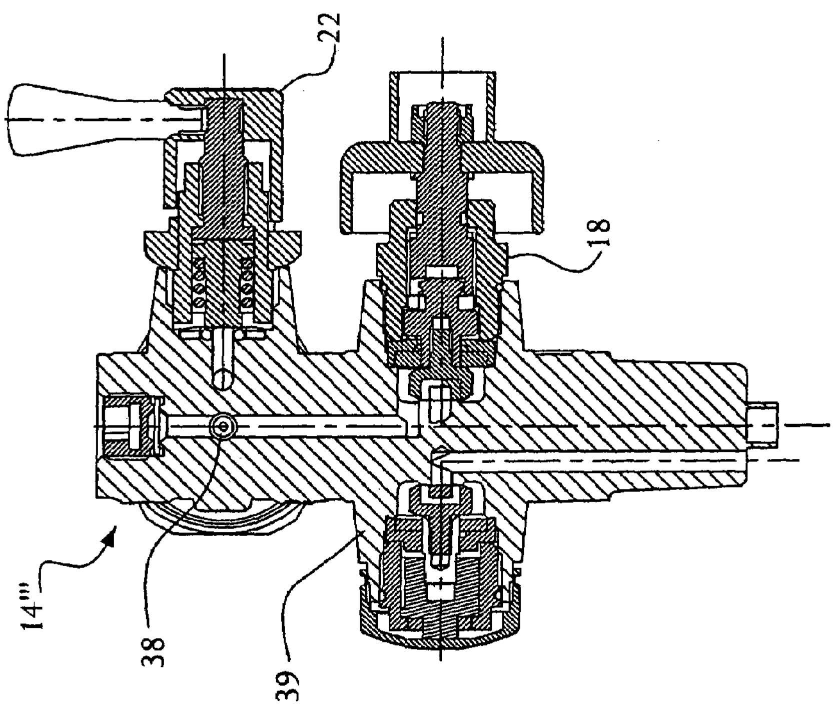
FIG. 10 is a cross sectional view of the configuration of FIG. 4, taken substantially along line 10B10 of FIG. 8.

As can be seen in FIG. 6, this flow may be usefully directed through a processing chamber 42 by situating the chamber 42 between the outlet port 38 and the vacuum generator 44.

Should the system inadvertently be opened to atmosphere, then flow of the hazardous gas will soon stop or be dramatically reduced, thereby reducing the risk of personnel exposure or of equipment damage. Similarly, should the low pressure valve 22 or both the low pressure valve 22 and the high pressure valve 18 be opened inadvertently, without first connecting the outlet port 38 to the vacuum source 44, then little or no gas will escape from the vessel.

Figure 7:
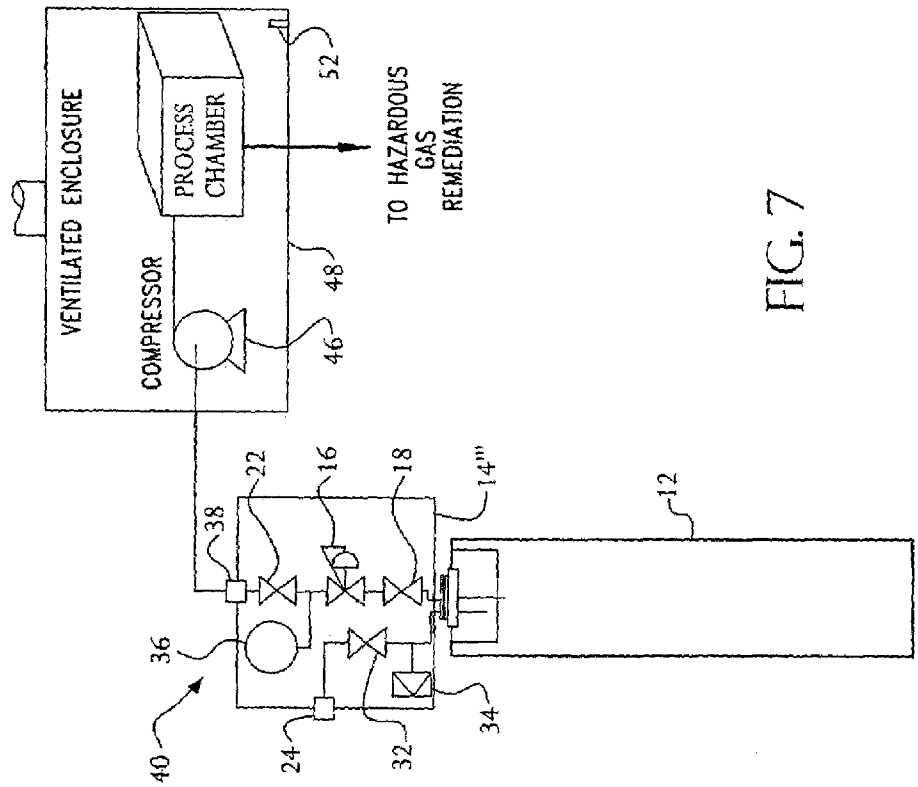
FIG. 7 is a simplified front view of the configuration of FIG. 4 where a compressor is used to deliver the gas at a higher pressure

As can be seen in FIG. 7, in cases where the gas must be delivered to a downstream process at pressures near or above atmospheric, then, optionally, a compressor 46 may be used to withdraw the product from the vessel at sub-ambient pressure and then to deliver the gas at a higher pressure. For added safety, this compressor 46 may be situated in a well-ventilated enclosure 48 and be interlocked with hazardous gas release detection sensors 52 (see FIG. 7).

For delivery of low-vapor pressure gases, it may be possible to have the valve/regulator assembly 14 welded onto the pressurized gas cylinder 12 or otherwise integrally attached to ensure complete sealing without valve threads to act as a possible leak source. A possible advantageous arrangement would place the sensitive components of the regulator 16 inside of the pressure vessel 12, thereby protecting them.

Connection between the gas outlet 38 and the user's vacuum system can be through any number of standard high-integrity vacuum connections, such as Swagelok®, VCR® and Ultratorr® connections from Cajon, Conflat® or Del-Seal™, or JIS, ISO, KF, W, B, or C seals from various sources. Also, the appropriate keyed gas cylinder connections recommended by the Compressed Gas Association may be used. As a possible extension, custom keyed connections could be instituted to ensure incompatible gases were not mistakenly connected. See generally FIGS. 8–11.

An optional integral valve protection device (akin to a cylinder cap) 54, shown schematically in FIG. 4, that allows making the low-pressure connection and actuation of the shut-off valve(s) without removing the protection device may be affixed to the container. Additionally, with or without the above feature, the valve protection cap 54 can optionally serve as secondary containment for vapors leaking from any threaded connections to the container and may optionally be fitted with a port 56 to attach leak detection equipment. An integral handle or other lifting aid may be molded into the protection device to make the package more easily transported and installed. Finally, optionally, a restrictive flow orifice downstream of the regulator 16 and valves 18, 22 may be used.

The present invention may optionally include a residual pressure valve 58 that can be connected upstream of the high-pressure shut-off valve 18 to prevent back flow of foreign gases, as can be seen in FIG. 4. The regulator in the present invention, however, could fulfill the role of inhibiting backflow itself, but surprisingly, a residual pressure valve upstream of the regulator can have a more fundamental role in maintaining fail-safe delivery only to a pre-set pressure.

A pressure reducing device (regulator) of the preferred single stage diaphragm design has the general property that the regulated downstream (outlet) pressure will vary with the inlet pressure so that decreasing inlet pressure leads to increasing outlet pressure. Therefore, since the crux of the present invention is to provide a device that will safely deliver gas or vapor only when the downstream pressure is below a certain value (e.g. below atmospheric pressure) that will not likely occur in transit or in storage, it is essential that the upstream pressure always be maintained above a certain pressure. The presence of the residual pressure valve in this context solves this problem.

Finally, the apparatus may be constructed of modular components such that the variations taught herein may be easily manufactured and easily changed by a user.

Although illustrated and described herein with reference to specific embodiments, the present invention nevertheless is not intended to be limited to the details shown. Rather, various modifications may be made in the details within the scope and range of equivalents of the claims without departing from the spirit of the invention.

What is claimed is:

1. An apparatus for containing and delivering hazardous gases at sub-atmospheric pressure from a pressurized container, comprising:

(a) a valve body in sealed communication with an outlet orifice of the pressurized container, said outlet orifice of said pressurized container open to an interior chamber of said pressurized container;

(b) a fluid discharge path in the valve body, between the outlet orifice of the pressurized container and an outlet orifice of the valve body;

(c) a pressure regulator having a pressure sensing means capable of responding to sub-atmospheric pressure, integral to said valve body, in-line in the fluid discharge path, said pressure regulator pre-set to a pressure below atmospheric pressure to allow said gas to be delivered through said regulator from said interior chamber only when said pressure sensing means senses a downstream pressure at or below said pre-set pressure; and (d) a high pressure shut-off valve integral to said valve body, in-line in the fluid discharge path and upstream from said pressure regulator;

whereby said gas may flow through from said interior chamber of said pressurized container through said fluid discharge path, through said outlet orifice of said pressurized container, and through said outlet orifice of said valve body only when said outlet orifice is connected to a vacuum system.

2. The apparatus for containing and delivering hazardous gases at sub-atmospheric pressure of claim 1, where the pressure regulator is preset and locked at the pressure below atmospheric.

3. The apparatus for containing and delivering hazardous gases at sub-atmospheric pressure of claim 1, including a low pressure shut-off valve in-line in the fluid discharge path, downstream of the pressure regulator, to control flow of gas from the gas cylinder and to protect the regulator from ingress of ambient air during storage and transit when said low pressure shut-off valve is in a closed position.

4. The apparatus for containing and delivering hazardous gases at sub-atmospheric pressure of claim 1, where the high pressure shut-off valve is biased to be normally closed when no energized vacuum system is connected to said outlet orifice of the valve body.

5. The apparatus for containing and delivering hazardous gases at sub-atmospheric pressure of claim 1, including a filling path in the valve body between the outlet orifice of the pressurized container and a filling port orifice of the valve body.

6. The apparatus for containing and delivering hazardous gases at sub-atmospheric pressure of claim 5, including a residual pressure valve, in-line in the fluid discharge path, upstream of the high-pressure shut-off valve, to prevent back flow of air or foreign gases.

7. The apparatus for containing and delivering hazardous gases at sub-atmospheric pressure of claim 5, where the filling path does not coincide with the fluid discharge path.

8. The apparatus for containing and delivering hazardous gases at sub-atmospheric pressure of claim 5, where the filling path is a path that flows from a point on said fluid discharge path adjacent the outlet orifice upstream of said pressure regulator and upstream of said shut-off valve, to a point on said discharge path adjacent said outlet orifice of said valve body.

9. The apparatus for containing and delivering hazardous gases at sub-atmospheric pressure of claim 5, wherein the filling port includes a keyed valve to prevent unauthorized access.

10. The apparatus for containing and delivering hazardous gases at sub-atmospheric pressure of claim 5, wherein the filling port includes a keyed gas-tight outlet cap to prevent unauthorized access.

11. The apparatus for containing and delivering hazardous gases at sub-atmospheric pressure of claim 1, wherein said pressure regulator is pre-set to a pressure of about −5 psig.

12. The apparatus for containing and delivering hazardous gases at sub-atmospheric pressure of claim 1, where said pressure regulator is preset at a fixed and unchangeable regulator pressure below atmospheric pressure.

13. The apparatus for containing and delivering hazardous gases at sub-atmospheric pressure of claim 1, where said pressure regulator includes a means to adjust said pre-set pressure.

14. The apparatus for containing and delivering hazardous gases at sub-atmospheric pressure of claim 13, where said means to adjust said pre-set pressure is keyed to prevent unauthorized access.

15. The apparatus for containing and delivering hazardous gases at sub-atmospheric pressure of claim 1, wherein the valve body is welded onto container to minimize any source of leakage of the gas in the pressurized container.

16. The apparatus for containing and delivering hazardous gases at sub-atmospheric pressure of claim 1, where apparatus utilizes modular components.

17. The apparatus for containing and delivering hazardous gases at sub-atmospheric pressure of claim 1, including a valve protection cap removably disposed on said pressurized container that serves as a secondary containment means for vapors leaking from the container and the apparatus.

18. The apparatus for containing and delivering hazardous gases at sub-atmospheric pressure of claim 17, where the valve protection cap has a port 35 to attach to a leak detection device.

19. The apparatus for containing and delivering hazardous gases at sub-atmospheric pressure of claim 1, wherein the vacuum system includes a compressor, wherein the vacuum system withdraws gas from the vessel at sub-atmospheric pressure and then compresses the gas to deliver said gas at a higher pressure.

20. An apparatus for containing and delivering hazardous gases at sub-atmospheric pressure from a pressurized container, comprising:

(a) a valve body in sealed communication with an outlet orifice of the pressurized container, said outlet orifice of said pressurized container open to an interior chamber of said pressurized container;

(b) a fluid discharge path in the valve body, between the outlet orifice of the pressurized container and an outlet orifice of the valve body;

(c) a pressure regulator having a pressure sensing means capable of responding to sub-atmospheric pressure, integral to said valve body, in-line in the fluid discharge path, said pressure regulator pre-set to a pressure below atmospheric pressure to allow said gas to be delivered through said regulator from said interior chamber only when said pressure sensing means senses a downstream pressure at or below said pre-set pressure;

(d) a high pressure shut-off valve integral to said valve body, in-line in the fluid discharge path and upstream from said pressure regulator;

(e) a low pressure shut-off valve in-line in the fluid discharge path, downstream of the pressure regulator, to control flow of gas from the gas cylinder and to protect the regulator from ingress of ambient air during storage and transit when said low pressure shut-off valve is in a closed position; and (f) a filling path in the valve body between the outlet orifice of the pressurized container and a filling port orifice of the valve body;

whereby said gas may flow through from said interior chamber of said pressurized container through said fluid discharge path, through said outlet orifice of said pressurized container, and through said outlet orifice of said valve body only when said outlet orifice is connected to a vacuum system.

21. The apparatus for containing and delivering hazardous gases at sub-atmospheric pressure of claim 20, where the pressure regulator is preset and locked at the pressure below atmospheric.

22. The apparatus for containing and delivering hazardous gases at sub-atmospheric pressure of claim 20, where the high pressure shut-off valve is biased to be normally closed when no energized vacuum system is connected to said outlet orifice of the container.

23. The apparatus for containing and delivering hazardous gases at sub-atmospheric pressure of claim 20, including a residual pressure valve, in-line in the fluid discharge path, upstream of the high-pressure shut-off valve, to prevent back flow of air or foreign gases.

24. The apparatus for containing and delivering hazardous gases at sub-atmospheric pressure of claim 20, where the filling path does not coincide with the fluid discharge path.

25. The apparatus for containing and delivering hazardous gases at sub-atmospheric pressure of claim 20, where the filling path is a path that flows from a point on said fluid discharge path adjacent the outlet orifice upstream of said pressure regulator and upstream of said shut-off valve, to a point on said discharge path downstream of said outlet orifice of said valve body.

26. The apparatus for containing and delivering hazardous gases at sub-atmospheric pressure of claim 20, wherein the filling port includes a keyed valve to prevent unauthorized access.

27. The apparatus for containing and delivering hazardous gases at sub-atmospheric pressure of claim 20, wherein the filling port includes a keyed gas-tight outlet cap to prevent unauthorized access.

28. The apparatus for containing and delivering hazardous gases at sub-atmospheric pressure of claim 20, wherein said pressure regulator is pre-set to a pressure of about −5 psig.

29. The apparatus for containing and delivering hazardous gases at sub-atmospheric pressure of claim 20, where said pressure regulator is preset at a fixed and unchangeable regulator pressure below atmospheric pressure.

30. The apparatus for containing and delivering hazardous gases at sub-atmospheric pressure of claim 20, where said pressure regulator includes a means to adjust said pre-set pressure.

31. The apparatus for containing and delivering hazardous gases at sub-atmospheric pressure of claim 30, where said means to adjust said pre-set pressure is keyed to prevent unauthorized access.

32. The apparatus for containing and delivering hazardous gases at sub-atmospheric pressure of claim 20, wherein the valve body is welded onto container to minimize any source of leakage of the gas in the pressurized container.

33. The apparatus for containing and delivering hazardous gases at sub-atmospheric pressure of claim 20, where apparatus utilizes modular components.

34. The apparatus for containing and delivering hazardous gases at sub-atmospheric pressure of claim 20, including a valve protection cap removably disposed on said pressurized container that serves as a secondary containment means for vapors leaking from the container and the apparatus.

35. The apparatus for containing and delivering hazardous gases at sub-atmospheric pressure of claim 34, where the valve protection cap has a port to attach to a leak detection device.

36. The apparatus for containing and delivering hazardous gases at sub-atmospheric pressure of claim 20, wherein the vacuum system includes a compressor, wherein the vacuum system withdraws gas from the vessel at sub-atmospheric pressure and then compresses the gas to deliver said gas at a higher pressure.

37. An method for containing and delivering hazardous gases at sub-atmospheric pressure from a pressurized container, comprising:

(a) providing a valve body in sealed communication with an outlet orifice of the pressurized container, said outlet orifice of said pressurized container open to an interior chamber of said pressurized container;

(b) providing a fluid discharge path in the valve body, between the outlet orifice of the pressurized container and an outlet orifice of the valve body;

(c) providing a pressure regulator having a pressure sensing means capable of responding to sub-atmospheric pressure, integral to said valve body, in-line in the fluid discharge path, said pressure regulator pre-set to a pressure below atmospheric pressure to allow said gas to be delivered through said regulator from said interior chamber only when said pressure sensing means senses a downstream pressure at or below said pre-set pressure; and (d) providing a high pressure shut-off valve integral to said valve body, in-line in the fluid discharge path and upstream from said pressure regulator;

(e) allowing said gas to flow through from said interior chamber of said pressurized container through said fluid discharge path, through said outlet orifice of said pressurized container, and through said outlet orifice of said valve body only when said outlet orifice is connected to a vacuum system.

38. The method for containing and delivering hazardous gases at sub-atmospheric pressure of claim 37, including the step of providing a low pressure shut-off valve in-line in the fluid discharge path, downstream of the pressure regulator, to control flow of gas from the gas cylinder and to protect the regulator from ingress of ambient air during storage and transit when said low pressure shut-off valve is in a closed position.

39. The method for containing and delivering hazardous gases at sub-atmospheric pressure of claim 38, including the step of providing an inert gas into the valve/regulator assembly subsequent to use of the gas and prior to closing the low pressure valve to reduce the risk of air ingress into the valve/regulator assembly during transit.

* * * * *